United States Patent [19]

Olson

[11] 3,909,593

[45] Sept. 30, 1975

[54] APPARATUS FOR VALIDATING PROCESSED DOCUMENTS

[75] Inventor: Lorin P. Olson, Tustin, Calif.

[73] Assignee: Addressograph Multigraph Corporation, Cleveland, Ohio

[22] Filed: Apr. 1, 1974

[21] Appl. No.: 457,070

[52] U.S. Cl. .............................. 235/61.9 R; 346/141

[51] Int. Cl. .......................... G06k 3/00; G01d 15/00

[58] Field of Search ............ 346/78, 79, 139 R, 140, 346/141; 235/61.9 R, 61.9 A

[56] References Cited

UNITED STATES PATENTS

| | | | |
|---|---|---|---|
| 3,212,203 | 10/1965 | Atkinson | 35/48 |
| 3,374,050 | 3/1968 | Robin et al. | 346/140 |
| 3,387,371 | 6/1968 | Schneider et al. | 346/141 |
| 3,438,354 | 4/1969 | Luescher | 346/141 |
| 3,793,983 | 2/1974 | Shelestak | 346/141 |

*Primary Examiner*—Daryl W. Cook

*Attorney, Agent, or Firm*—Harry M. Fleck, Jr.

[57] ABSTRACT

An apparatus is provided for validating documents bearing optically readable data. The apparatus includes a solenoid which brings a marking wheel into engagement with each document to mark such prior to exit from the reading unit. During each marking operation, rotary motion is imparted to the wheel, whereby usage of the marking substance is evenly distributed around the wheel's circumference to realize maximum wheel life.

13 Claims, 5 Drawing Figures

APPARATUS FOR VALIDATING PROCESSED DOCUMENTS

The present invention is generally related to document processors and, more particularly, to an improved apparatus for automatically validating or marking documents as they are processed.

In recent years, various document processors have been proposed or manufactured which optically read certain data from a document, such as a sales form bearing mark sense data. The processor may take the form of a master unit, such as that disclosed by U.S. Pat. No. 3,684,864 which includes its own microprocessor for performing various functions on the data sensed from the document. On the other hand, the document may be read by a slave unit connected to a central microprocessor which performs the various computer operations. A typical slave unit would include a reader and a document transport for moving each document past the reader. One such slave unit is disclosed by the pending U.S. patent application entitled "Document Transport and Registration Apparatus," filed concurrently with the present application and bearing the same inventor and assignee as the present application. It will be appreciated that such slave units may be provided with a printer which prints information on the document as it is exited from the machine.

In order to avoid multiple processing of the documents, it has been found desirable to in some way mark each document after it has been properly processed or validated. The "validation" marking is of such a character that it is readily recognizable by the reader if the document is subsequently inserted into the unit in an attempt to reprocess the document. In such event, signals are generated by the reader due to the presence of the validation mark. These signals are immediately recognized by the microprocessor, which in turn rejects the document and/or the data thereon. In the past, such validation marks were made by the printing mechanism upon exit of the document from a slave or master unit. However, in recent years it has been found more economical to provide systems which include several slave units which do not require self-contained printers. To provide such slave units with expensive and relatively complex printers merely for the purpose of producing a validation mark would be impractical from a cost standpoint. Therefore, it is an object of the present invention to provide a novel apparatus for validating processed documents which is relatively inexpensive to manufacture, yet is highly reliable and requires a minimum amount of maintenance.

Another object of the present invention is to provide a unique document validation apparatus which may be mounted to a document transport apparatus for marking each document as it is exited in response to electrical signals representative of the proper processing of the document.

It is a further object of the present invention to provide a versatile document validation apparatus including a rotatable wheel carrying transferrable marking substance around its circumference and means for effecting controlled rotation of the wheel during each marking operation to assure that usage of the marking substance is evenly distributed whereby maximum wheel life is obtained.

Still another object of the present invention is to provide a novel document validation apparatus including a marking wheel which is selectively lowered into momentary contact with a document, whereby the wheel is rotated slightly by the forces imparted thereto upon contact with the stationary document or, alternately, by forces associated with the movement of the document during the momentary contact.

DESCRIPTION OF THE PREFERRED EMBODIMENT

Figures 1, 2, 3, 4, 5:
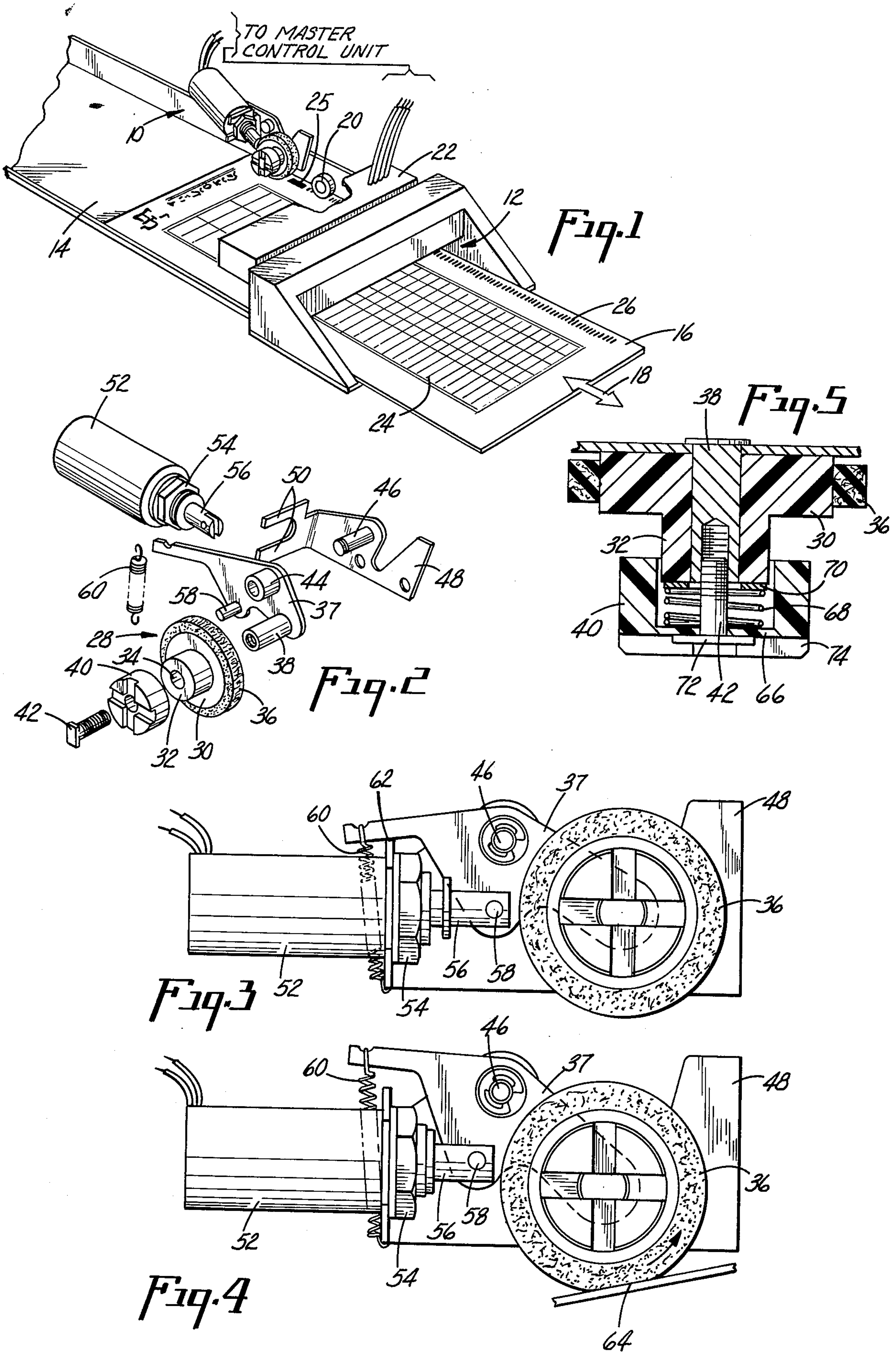
FIG. 1 is a perspective view of the document validation apparatus mounted to a typical document transport and reader.
FIG. 2 is an exploded perspective view of the document validation apparatus shown in FIG. 1.
FIG. 3 is a side elevation of the validation apparatus with the marking wheel in the raised position.
FIG. 4 is a side elevation similar to FIG. 3 but with the marking wheel in the lowered position contacting a document.
FIG. 5 is a sectional view of the marking wheel and associated brake.

Referring now, more particularly, to FIG. 1 of the drawings, the document validation apparatus of the present invention is generally indicated by the numeral 10 and is shown mounted to a typical document transport and reading device such as that disclosed in the pending U.S. patent application Ser. No. 457,072 entitled "Document Transport and Registration Apparatus," assigned to the assignee of the present invention. Such a document transport include an input/output opening 12 which is in alignment with a document support member 14 defining a generally planar support surface over which a document, such as that indicated at 16 is entered and exited in directions indicated by the arrow 18. Movement of the document is controlled by appropriate motive means, such as the roller indicated at 20, driven by a motor, or other appropriate means, not illustrated. The document being processed may be of the mark sense type, such as disclosed in U.S. Pat. No. 3,639,732 including a plurality of mark sense rows and columns 24 and a series of timing marks 26 extending along one side of the document. Of course, it is not intended that the apparatus of the present invention be limited to use with any particular type of document, and the document described and illustrated is referred to merely for the sake of explanation. As mentioned above, the main purpose of the validation apparatus of the present invention is to provide a mark on the document after such has been properly processed. Such a mark is indicated at 25 and may be made while the document is stationary or while the document is being exited from the reader.

Referring now, more particularly, to FIGS. 2–4, the construction of the validation apparatus may be seen in more detail. Actual marking of the document is achieved by a marking wheel generally indicated by the numeral 28 including a relatively rigid hub 30, preferably formed from plastic, such as nylon, or other suitable material and including a bushing or neck portion 32 with an axial bore 34 formed therein. The marking wheel further includes a circular marking element 36 which is mounted to hub 30 and carries a suitable marking substance, such as ink or the equivalent thereof. Preferably, the marking element 36 is made of Porelon, which is a registered trademark and product of Porelon, Inc. This standard commercially available material contains a suitable marking substance which is readily transferrable to the document and which is readily recognizable by most optical scanning or reading units. The Porelon material is relatively soft and flexible in nature, such that it is yieldably deformed upon contact with a document during the marking operation. Of course, it is not intended that the marking element be limited specifically to Porelon, as other materials may be utilized so long as such provide satisfactory marking the required characteristics which enhance rotation of the wheel, as hereinafter described.

Marking wheel 28 is rotatably mounted to a support 38 and held in place by way of a brake element 40 and its associate adjustment screw 42, which are hereinafter described in more detail. Lever 37 is rotatably supported by a bushing 44 mounted to a pivot pin 46 associated with a stationary bracket 48. Bracket 48 includes a pair of spaced mounting arms 50 which support a conventional electrical solenoid 52 by way of a mounting nut 54. The solenoid includes a reciprocal plunger 56 which is fastened to a pin 58 integral with lever 37. When the solenoid 52 is energized, plunger 56 is pulled inward to cause clockwise movement of lever 37 against the forces of a return spring 60, whereby marking wheel 28 is lowered into contact with the document, as described hereinafter.

With particular reference to FIGS. 3 and 4, operation of the validation apparatus may be understood in more detail. With the solenoid 52 in a deenergized condition, marking wheel 28 is in a raised position, such that it is spaced apart from the underlying document and does not mark such as the document is transported under the reader. This position of the marking wheel and associated components is illustrated in FIG. 3. It will be appreciated that coil tension spring 60 extends between the end of lever 37 to an appropriate fastening point on stationary bracket 48. With solenoid 52 deenergized, the lever is influenced by spring 60 against stop surface 62 of bracket 48.

When solenoid 52 is energized by appropriate electrical signals from a control, such as a master control unit, plunger 56 is pulled inward to a position illustrated in FIG. 4. This operation causes clockwsie rotation of lever 37, which lowers marking wheel 28 into contact with the underlying document 16. As mentioned above, one of the unique features of the apparatus of the present invention is that the marking wheel is rotated slightly upon each marking operation, whereby the usage of marking substance is evenly distributed about the circumference of the marking wheel. This rotation may be achieved in either of two manners or by a combination of both. In the preferred embodiment illustrated in FIG. 4, it will be observed that the rotational axis of marking wheel 28 is closer to the underlying document than is the pivotal axis of lever 37 when the wheel comes into contact with the document. Thus, the motion of the marking wheel from the raised position to the lowered position is such that contact is made at an angle to the document. This imparts a slight counterclockwise rotation to the marking wheel as it is brought into full contact with the document. The "spongy" characteristics of marking element 36 permits this slight rotation to occur during contact with the document. When the marking wheel is completely lowered, the marking element is somewhat flattened, as indicated at 64.

Due to the above-described geometry and spongy characteristics of the marking element, it will be appreciated that for each marking operation, the marking wheel is advanced a slight increment. This marking wheel also may be advanced very slightly due to the rapid acceleration forces imparted to the wheel by the solenoid during the lowering process. Over a period of time, the usage of the marking substance will be evenly distributed around the circumference of the marking element. This assures a maximum utilization of the marking wheel, permitting a maximum time period between wheel replacements.

In addition to imparting rotation to the marking wheel as described above, the marking operation may be timed with movement of the document, whereby the frictional forces between the document and marking wheel impart a slight rotation thereto. It has been found, however, that this requires that the document speed and timing of the marking operation be accurately preset if the marking wheel is to be incrementally advanced the proper amount for each operation. By imparting rotation of the wheel due to contact with a stationary document, as described above, the amount of wheel advancement is independent of document speeds or timing variables.

In order to carefully control the amount of wheel rotation for each marking operation, the apparatus is provided with a friction brake, best illustrated in FIG. 5. The brake applies very mild frictional forces to the axial surfaces of hub 32 to prevent undesirable spinning of the marking wheel or movement thereof in angular increment which might result in spotty usage of the marking substance around the wheel's circumference. The brake includes a generally cyclindrical, hollow housing 40 which is open at one end. The closed end of housing 40 defines a seat 66 for a coil compression spring 68, which applies mild biasing forces against a washer 70. Housing 40 is held in place by way of an adjustable screw 42 having a rectangular head 72 which cooperates with one of a pair of slots 74 formed in the housing. Screw 42 is threaded to support shaft 38.

It will be appreciated that the pressure and corresponding frictional forces exerted by washer 70 against hub 32 may be adjusted by changing the axial position of screw 42 with respect to a support shaft 38. If an increased brake pressure setting is made, the marking wheel rotation will be correspondingly limited. In order to achieve a satisfactory distribution of the usage of marking material, the brake should be adjusted to provide relatively small angular advancement of the wheel for each marking operation. Of couse, it is not intended that the present invention be limited to the use of the particular brake structure described and illustrated. If desired, other appropriate braking means may be utilized to provide the above-described results.

From the foregoing description, it will be appreciated that the document validation apparatus of the present invention is of relatively simple construction requiring a minimum number of parts, and accordingly, is relatively inexpensive to manufacture and maintain. Furthermore, by providing controlled incremental advancement of the marking wheel, the maximum usage of the wheel is obtained, whereby the time periods between wheel replacements is maximized.

The present invention has been described in considerable detail with particular reference to a preferred embodiment thereof, but it will be understood that variations and modifications can be effected within the spirit and scope of the invention.

What is claimed is:

1. For use with a document reader which transports a document past a read head, an apparatus for marking the document subsequent to reading, said apparatus comprising:

a stationary frame including a document support member defining a support surface, a lever pivotally mounted to said frame for movement about a first axis and disposed above said support surface, said lever being movable between a raised position and a lowered position, a circular marking element rotatably carried by said lever for rotation about a second axis, said marking element carrying a transferrable marking substance, and actuator means for effecting movement of said lever to said lowered position to bring said marking element into engagement with a document on said support surface.

2. The apparatus set forth in claim 1 wherein said second axis is closer to said support surface than said first axis when said lever is in said lowered position, whereby said marking element is caused to rotate slightly upon contact with a stationary document.

3. The apparatus set forth in claim 2 wherein at least a portion of said marking element is of soft, flexible material which engages a document during each marking operation.

4. The apparatus set forth in claim 3 including friction brake means connected to said lever and operatively engaging said marking element to limit the rotation imparted thereto during each marking operation, whereby usage of the marking substance is evenly distributed around the circumference of the marking element.

5. The apparatus set forth in claim 4 wherein said brake means includes means for selectively adjusting the frictional forces limiting rotation of said marking element.

6. The apparatus set forth in claim 1 wherein movement of said lever toward said lowered position by said actuator means effects rotational movement of said marking element relative to said lever.

7. In combination:

a document transport and marking apparatus, said document transport comprising a document support member defining a support surface, and motive means for moving a document in a predetermined direction of travel over said support surface, said marking apparatus comprising a marking element generally disposed above said support surface and normally spaced therefrom a sufficient distance to provide clearance for a document to pass between said marking element and said support surface, said marking element being of circular configuration and mounted for rotation about an axis generally transverse of said direction of document travel, and actuation means operatively connected to said marking element for selectively lowering such from said normal position to a marking position in engagement with an underlying document, said marking member carrying a readily transferrable marking substance for deposit on the document.

8. The combination set forth in claim 7 wherein said actuation means lowers said marking member in response to electrical signals representative of a predetermined condition.

9. The combination set forth in claim 7 wherein said motive means is moving the document when the document is engaged by said marking element whereby a mark of predetermined length is made on the document.

10. In combination:

a document transport and marking apparatus, said document transport comprising a document support member defining a support surface, and motive means for moving a document in a predetermined direction of travel over said support surface, said marking apparatus comprising a marking element generally disposed above said support surface and normally spaced therefrom a sufficient distance to provide clearance for a document to pass between said marking element and said support surface, and actuation means operatively connected to said marking element for selectively lowering such from said normal position to a marking position in engagement with an underlying document, said marking member carrying a readily transferrable marking substance for deposit on the document, said motive means moving the document when the document is engaged by said marking element whereby a mark of predetermined length is made on the document, said marking element being of circular configuration and mounted for rotation about an axis generally transverse of said predetermined direction of document travel, movement of the document during said engagement imparting rotation to said circular marking element whereby usage of said marking substances is evenly distributed around the circumference of said marking element over several marking operations.

11. The combination set forth in claim 10 wherein said marking apparatus includes brake means associated with said marking element for limiting the amount of free rotation thereof caused by each marking operation.

12. The combination set forth in claim 11 wherein said actuation means includes a lever which carries said marking element and a reciprocal actuator operatively connected to said lever to effect movement thereof between first and second pivotal positions corresponding to said normal and marking positions of said marking element, respectively.

13. The combination set forth in claim 12 wherein said actuator comprises a solenoid operative in response to electrical signals representative of a predetermined condition.

* * * * *